(12) United States Patent
Kolavennu (10) Patent No.: US 9,024,480 B2
(45) Date of Patent: May 5, 2015

(54) CONTROLLER FOR WIRELESS ENERGY TRANSFER

(75) Inventor: Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 615 days.

(21) Appl. No.: 13/015,217

(22) Filed: Jan. 27, 2011

(65) Prior Publication Data

US 2011/0181121 A1  Jul. 28, 2011

Related U.S. Application Data

(60) Provisional application No. 61/298,906, filed on Jan. 27, 2010.

(51) Int. Cl.
| | |
|---|---|
| *H01F 27/42* | (2006.01) |
| *H01F 37/00* | (2006.01) |
| *H01F 38/00* | (2006.01) |
| *H02J 5/00* | (2006.01) |

(52) U.S. Cl.
CPC ..................... *H02J 5/005* (2013.01)

(58) Field of Classification Search
CPC combination set(s) only.
See application file for complete search history.

(56) References Cited

U.S. PATENT DOCUMENTS

| | | | |
|---|---|---|---|
| 8,178,995 B2 * | 5/2012 | Amano et al. ................. | 307/9.1 |
| 8,421,274 B2 | 4/2013 | Sun et al. | |
| 8,823,214 B2 | 9/2014 | Liu et al. | |
| 2009/0072628 A1 | 3/2009 | Cook et al. | |
| 2009/0243397 A1 | 10/2009 | Cook et al. | |
| 2010/0036773 A1 * | 2/2010 | Bennett ........................... | 705/67 |
| 2011/0133569 A1 | 6/2011 | Cheon et al. | |
| 2011/0156493 A1 * | 6/2011 | Bennett ........................ | 307/104 |
| 2012/0164943 A1 * | 6/2012 | Bennett ........................ | 455/41.1 |
| 2013/0278209 A1 * | 10/2013 | Von Novak et al. .......... | 320/108 |

OTHER PUBLICATIONS

"U.S. Appl. No. 13/015,179, Non Final Office Action mailed Jun. 20, 2013", 14 pgs.
"U.S. Appl. No. 13/015,179, Notice of Allowance mailed Apr. 28, 2014", 8 pgs.
"U.S. Appl. No. 13/015,179, Response filed Mar. 31, 2014 to Final Office Action mailed Jan. 31, 2014", 10 pgs.

* cited by examiner

*Primary Examiner* — Jared Fureman
*Assistant Examiner* — Aqeel Bukhari
(74) *Attorney, Agent, or Firm* — Schwegman Lundberg & Woessner, P.A.

(57) ABSTRACT

A system includes a network and a controller. The network has a plurality of nodes. The plurality of nodes includes a first node and a second node. The first node is configured to transmit energy to the second node. The first node is magnetically coupled with the second node. The plurality of nodes includes at least one controllable node having a performance parameter and including at least one sensor. The at least one sensor is configured to generate a signal corresponding to energy received by the sensor. The controller has an output coupled to the at least one controllable node. The output is determined based on the signal. The performance parameter is selected based on the output.

21 Claims, 4 Drawing Sheets

CONTROLLER FOR WIRELESS ENERGY TRANSFER

CLAIM OF PRIORITY

This patent application claims the benefit of priority, under 35 U.S.C. Section 119(e), to Soumitri N. Kolavennu, U.S. Provisional Patent Application Ser. No. 61/298,906, entitled "CONTROLLER FOR WIRELESS ENERGY TRANSFER," filed on Jan. 27, 2010, which is hereby incorporated by reference herein in its entirety.

BACKGROUND

Wireless transmission of energy is inconvenient and inefficient, particularly so at longer distances. For example, one type of wireless battery recharging system requires that a cellular telephone be physically placed atop a charging mat. For such a device, the requirement for close proximity between the device and the charging mat tends to nullify the benefit of eliminating a wired connection. A typical recharging mat is incapable of wireless power transmission at a distance greater than a few centimeters.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Various embodiments provide a solution to the problem of inefficient wireless energy transfer. One example includes a controller configured to monitor energy transferred between an RF transmit coil and a receive coil. The controller is configured to provide instructions to adjust a parameter that influences the wireless energy transfer.

In one example, energy is transferred between a transmit coil and a receive coil by magnetic coupling. At various distances, the energy can be transferred by a single hop (that is, between a transmit coil and a receive coil) or by multiple hops (by a plurality of intermediary coil elements positioned between a transmit coil and a receive coil).

A number of parameters influence the strength of the magnetic coupling between a transmit coil and a receive coil. These parameters can be adjusted to increase or decrease the coupling and thus, change the efficiency of the energy transfer. Examples of such parameters include the radio frequency of the energy transmission, the distance between the coils, the geometry of the coil, and the relative orientation of the coils. In addition, nearby coils can increase the loading, and thus change the energy transfer efficiency.

An example of the present subject matter includes a controller that adjusts the coupling between the transmit coil and the receive coil to ensure good energy transfer efficiency.

In one example, energy is wirelessly transmitted within a network. The network includes a plurality of nodes. In one example, each node includes a coil which may be further identified as a transmit coil, a receive coil, an intermediary coil, or as a nearby coil. Any particular network can have multiple transmit coils, multiple receive coils, and multiple intermediary or nearby coils. The energy transfer within the network can take a variety of forms, including from multiple transmit coils to a single receive coil; from a single transmit coil to multiple receiver coils; or from a transmit coil to a receive coil through multiple intermediary coils. With an increasing number of nodes in an energy transmission network, the task of controlling the energy transfer efficiency becomes more complex.

An example of the present subject matter is configured to control and coordinate the nodes in a network in order to achieve a particular efficiency of energy transfer to a subset of nodes.

Figure 1A:
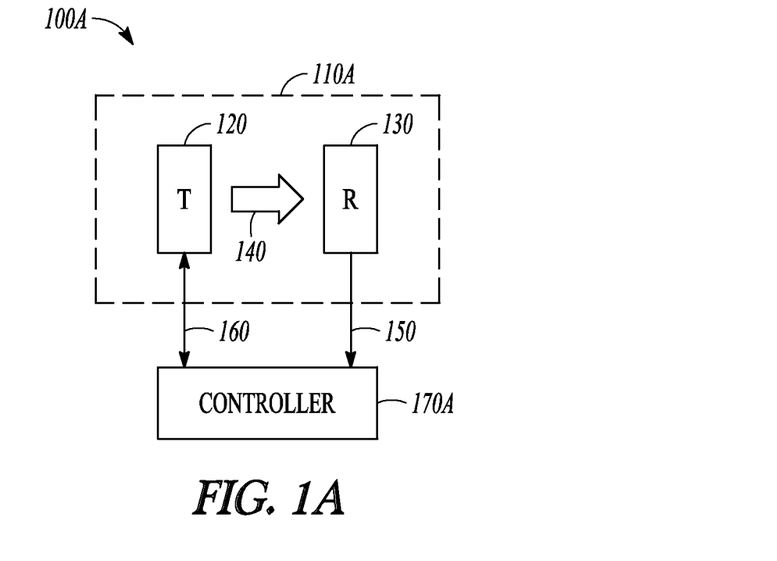
FIG. 1A illustrates a wireless energy transfer system, according to one example.

FIG. 1A illustrates a one-hop energy transfer system 100A, including network 110A and controller 170A. Network 110A includes node 120, labeled to indicate a transmit coil, and node 130, labeled to indicate a receive coil. One example of a node includes a coil having a plurality of windings of copper wire arranged in a helix pattern about a core. A node can include other configurations of electrically conductive materials, including, for example, a planar spiral of conductive traces on a circuit board or flexible membrane.

Nodes 120 and 130 are magnetically coupled as indicated by arrow 140. In one example, nodes 120 and 130 include windings arranged about a core having an axis parallel with arrow 140. Nodes 120 and 130 are spaced apart from each other by a distance.

Magnetic coupling of a radio frequency electrical current in node 120 will induce a corresponding electrical current in node 130. In one example, the windings of node 120 are connected to an RF signal source and an amplifier and the windings of node 130 are connected to an electrical load. The electrical load can include a portable device such as a cellular telephone, a laptop computer, or other wireless device powered by a rechargeable battery. A powered node, such as one excited by an RF signal source and amplifier or excited by metered line service, can be deemed an active node and an unpowered node, such as node 130, can be deemed a passive node.

In FIG. 1A, controller 170A is communicatively coupled to both node 120 and node 130. Node 130 provides a signal to controller 170A, via link 150, corresponding to the energy received by node 130 or corresponding to a parameter associated with node 130 (such as a measure of alignment). Link 150 can include a wired connection or a wireless communication channel, such as an infrared channel, an ultrasonic channel or a radio frequency communication channel compatible with a protocol such as Bluetooth, ZigBee, or ANT. Node 130, in one example, includes a sensor that provides a signal based on energy received in the windings of node 130. The signal is encoded and provided to controller 170A. In FIG. 1A, the arrowhead on link 150 indicates that the signal passes from node 130 to controller 170A, however, in other example, link 150 is bidirectional.

In addition, node 120 is configured to receive an instruction from controller 170A, via link 160. The instruction is generated by controller 170A based on various parameters including the signal received from node 130. The instruction is configured to change a parameter that affects or controls the transfer of energy from node 120 to node 130. Link 160 can include a wired connection or a wireless communication channel, such as an infrared channel, an ultrasonic channel or a radio frequency communication channel compatible with a protocol such as Bluetooth, ZigBee, or ANT. Node 120, in one example, includes an electromechanical actuator that changes a parameter that impacts the energy transmitting capability of node 120. For example, node 120 can include an electrically operated switch to control the number of windings through which a current flows in node 120. In FIG. 1A, the arrowheads on link 160 indicate that the communication between node 120 and controller 170A is bidirectional. For example, a sensor at node 120 can provide a feedback signal corresponding to a performance parameter of node 120. The signal can be encoded with the performance parameter which can denote, for example, a resonant frequency of node 120, alignment of node 120, position of node 120, or a coupling coefficient as to node 120.

The signal provided by node 130 can be based on a sensor coupled to node 130 or based on an electrical output provided by node 130. In addition, various parameters can be controlled by an instruction from controller 170A and selected to affect the energy transfer. For example, nodes 120 and 130 each have a resonant frequency determined by such parameters as the number of windings, various dimensions of the windings, the shape of the coil and other parameters that determine the resistance, inductance, and capacitance of the node. The resonant frequency can be adjusted by suitable adjustment of a parameter and in one example, controller 170A is configured to provide an instruction to select a particular resonant frequency. In one example, energy transfer efficiency is optimized by matching the resonant frequency of node 120 and the resonant frequency of node 130. In various examples, controller 170A is configured to adjust node 120 to change the magnetic coupling by controlling a form factor, controlling a node position, or by controlling relative alignment as to node 120 and node 130.

Controller 170A is configured to tune the energy transfer to achieve a selected transfer efficiency. The physical location of controller 170A can be tailored to suit a particular application. For example, controller 170A can include a module located at node 120, located at node 130, or located at another node not shown in FIG. 1A, or distributed throughout the various elements of network 110A.

In various examples, link 150 and link 160 carry modulated signals that are communicated in conjunction with a carrier signal on which the energy is transferred. In other examples, link 150 and link 160 are separate from the magnetically coupled energy transfer.

Figure 1B:
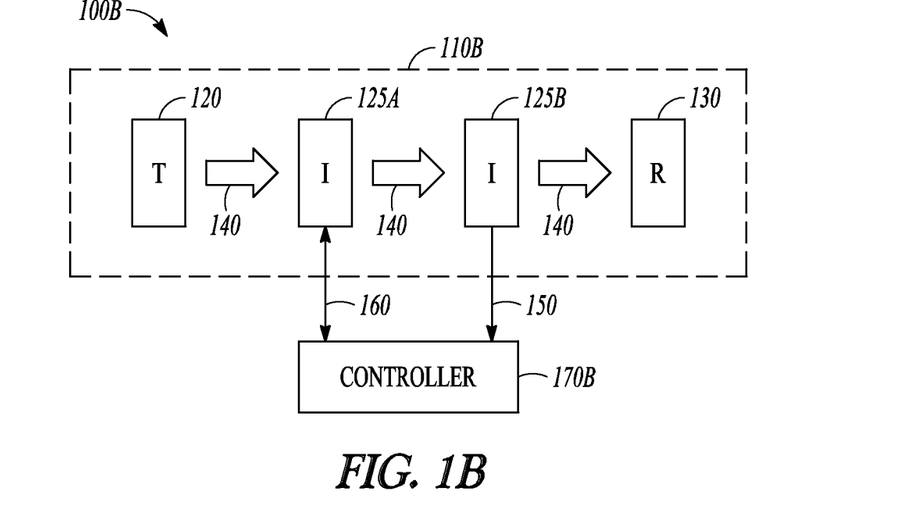
FIG. 1B illustrates a wireless energy transfer system, according to one example.

FIG. 1B illustrates an example of a multiple hop energy transmission system. FIG. 1B illustrates system 100B including network 110B and controller 170B. Network 110B includes node 120 (labeled to indicate a transmit coil), node 130 (labeled to indicate a receive coil), node 125A (labeled to indicate an intermediary coil), and node 125B (also labeled to indicate an intermediary coil). Nodes 125A and 125B are passive nodes and can include open circuit coils in which the ends of the electrical conductor terminates in an open circuit or in which the ends of the electrical conductor are connected to a network of one or more passive elements. Nodes 125A and 125B, as with the other nodes of a network, can include coils having various configurations.

Nodes 120, 125A, 125B, and 130 are magnetically coupled as indicated by arrows 140. In one example, nodes 125A and 125B are substantially aligned along a common axis and are spaced apart from each other by a distance. In other examples, nodes 125A and 125B are located at positions off of a line between nodes 120 and 130.

Controller 170B is configured to receive a signal from node 125B (via link 150) corresponding to energy transfer and provides an instruction to node 125A (via link 160). The instruction is configured to adjust the energy transfer efficiency. In FIG. 1B, controller 170B is external to network 110B, however in another example, controller 170B is included in network 110B.

In FIG. 1B, node 120, node 125B, and node 130 are fixed and non-adjustable and the energy transfer efficiency is managed by controlling node 125A based on a signal derived from node 125B.

Figure 2:
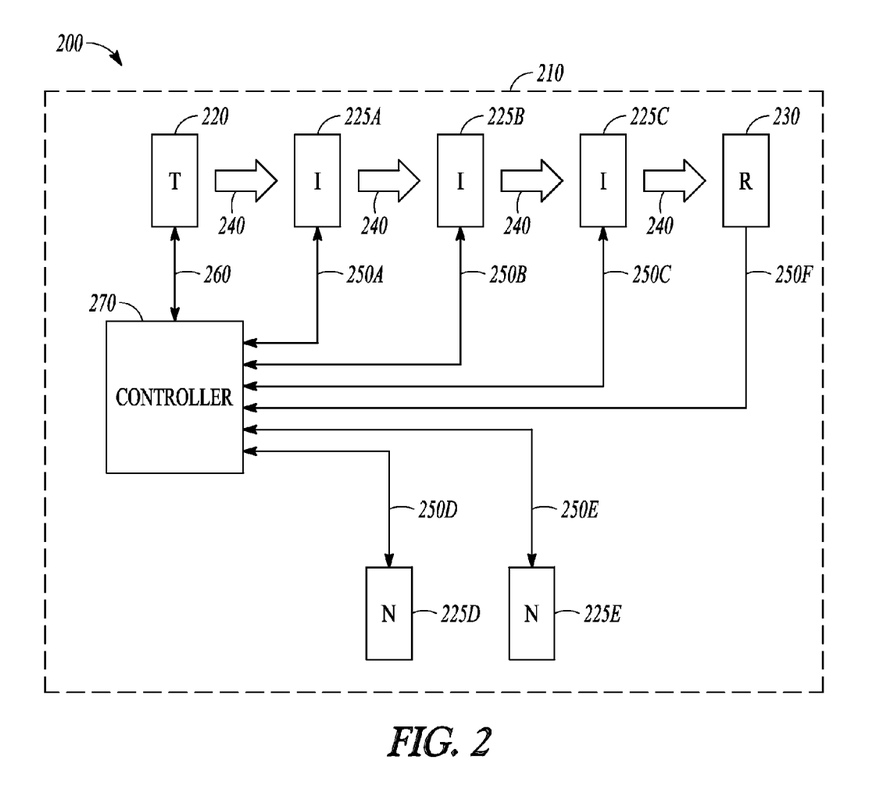
FIG. 2 illustrates a wireless energy transfer system, according to one example.

FIG. 2 illustrates system 200 which includes network 210 configured for multiple hop energy transmission. System 200 includes controller 270 configured for wireless energy transfer. Network 210 includes node 220 (labeled to indicate a transmit coil), node 230 (labeled to indicate a receive coil), and nodes 225A, 225B, and 225C (each of which is labeled to indicate an intermediary coil). In addition, network 210 includes nodes 225D and 225E (labeled to indicate nearby coils). Nodes 225A, 225B, and 225C are passive nodes and can include open circuit coils in which the ends of the conductor terminate in an open circuit or are connected to a network of one or more passive elements. Nodes 225D and 225E can include one or more receive coils, one or more transmit coils (active), or can include one or more passive coils. Nodes 225A, 225B, 225C, 225D, and 225E, as with the other nodes of a network, can include coils having various configurations.

Nodes 220, 225A, 225B, 225C, and 230 are magnetically coupled as indicated by arrows 240, are aligned along a common axis, and are spaced apart from each other by a distance. Nodes 225D and 225E may be positioned and aligned in a manner that either does or does not impact the magnetic coupling between node 220 and node 230. For example, nodes 225D and 225E can be purposefully shunted off-line in order to improve the efficiency of energy transfer to node 230. Nodes 225D and 225E can be shunted off-line by changing their alignment, changing their resonant frequency, changing their position, or by changing another performance parameter.

Controller 270 is communicatively coupled to node 220 by bidirectional link 260, to node 225A by bidirectional link 250A, to node 225B by bidirectional link 250B, to node 225C by bidirectional link 250C, to node 225D by bidirectional link 250D, and to node 225E by bidirectional link 250E. In addition, controller 270 is communicatively coupled to receive a signal from node 230 by link 250F.

Controller 270 is configured to provide an instruction to each of nodes 220, 225A, 225B, 225C, 225D, and 225E based on a signal received from node 230 and based on a signal received from each of nodes 220, 225A, 225B, 225C, 225D, and 225E.

Controller 270 can implement a variety of algorithms in managing the energy transfer provided by system 200. For example, the transmit coil of node 220 can be tailored in response to energy received at any combination of the downstream coils including nodes 225A, 225B, 225C, and 230. In addition, controller 270 can tune (or detune) nodes 225D and 225E in a manner to reduce the loading or interference exerted by the presence of these or other nearby nodes. In addition, controller 270 can select and tune nodes to provide efficient energy transfer using a variety of physical pathways as determined by locations of the various network elements.

In general, the system dynamics for multiple resonating coils (such as that in FIG. 2) can be expressed in the form:

$$\frac{dx}{dt} = A*x + b$$

$$x = \begin{bmatrix} a_1 \\ a_2 \\ a_3 \\ \vdots \\ a_x \end{bmatrix} \quad A = \begin{bmatrix} (i\omega - \Gamma_1) & i\kappa_{12} & i\kappa_{13} & \cdots & i\kappa_{1x} \\ i\kappa_{21} & (i\omega - \Gamma_2) & i\kappa_{23} & \cdots & i\kappa_{2x} \\ i\kappa_{31} & i\kappa_{32} & (i\omega - \Gamma_3) & \cdots & \kappa_{3x} \\ \vdots & \vdots & \vdots & \ddots & \vdots \\ \kappa_{x1} & \kappa_{x2} & \kappa_{x3} & \cdots & (i\omega - \Gamma_x) \end{bmatrix}$$

Where b is the forcing function, $a_i$ is the amplitude at node i, and $|a_i|^2$ denotes the energy in node i. To find the solution, solve the above set of ODE with an initial condition $x_0$. To solve the differential equations $\kappa_{ij}$ is expressed as a function of distance and orientation. For purposes of this explanation, the objective is to model the coupled electro-magnetic dynamics and the dynamic behavior of the coupled system. The solutions provide a representative profiles for particular values of the parameters of the ODE.

Assuming node 1 is the driver (transmit coil), then the modeling can include the following sequence:

a) Receive network topology and distance between nodes c;

b) Find $\kappa_{ij}$ and $\Gamma$ (if $\omega$ is different, change $\kappa_{ij}$ and $\Gamma$ based on $\omega$);

c) Set up A matrix and initial conditions $x_0$;

d) Solve $dx/dt = A*x + b$;

e) Solution provides $a_1(t)$ $a_2(t)$ $a_3(t)$ . . . ;

f) Plot energy at each node $|a_1(t)|^2$, $|a_2(t)|^2$, $|a_3(t)|^2$, $|a_t(t)|^2$ . . . ;

g) Find energy transfer efficiencies $|a_t(t)|^2/|a_1(t)|^2$

Controller 270 can be configured to provide energy transfer in a system of multiple hops, as shown in FIG. 2. A number of rules can be implemented by controller 270 in order to achieve a particular energy transfer efficiency using multiple-hop energy transfer at a distance. For example, one rule provides that multiple-hop energy transfer at a distance is greater than for a single hop for that same distance. By way of specific example, a two-hop energy transfer of energy at a distance of 2 m has an efficiency (approximately 62%) which is greater than the efficiency for a single-hop at the same distance (approximately 15%). Furthermore, a 15-hop energy transfer at 15 meters (10% efficiency) is achievable but direct energy transfer at this same distance is zero. In addition, the efficiency of multiple-hop energy transfers at a distance is only slightly lower than for the single hop at half the distance. In particular, a two-hop energy transfer at 2 m (62%) compares with a direct energy transfer (one-hop) at 1 m (approximately 73%). The decrease in efficiency at two hops (n-hops) compared to one hop and half the distance (1/n distance) is inversely proportional to the coupling coefficient at one hop. Experimental results can show a significant decrease from one-hop 2 m efficiency (approximately 15%) to 2-hop 4 m transfer efficiency of 5% (compare this to 73% to 62% drop at stronger coupling).

For a given distance between the nodes, the greater the number of hops between the energy source (transmit coil) and the energy recipient (receive coil), the better is the energy transfer efficiency. For example, for energy transfer across a distance of 6 m, the following table shows simulated performance for various configurations:

| Number of intermediate nodes | Number of hops, distance each | Efficiency, overall | Efficiency, per hop |
|---|---|---|---|
| 5 | 6 @ 1 m/hop | 33% | 73% @ 1 m |
| 4 | 5 @ 1.2 m/hop | 28% | 64% @ 1.2 m |
| 3 | 4 @ 1.5 m/hop | 15% | 46% @ 1.5 m |
| 2 | 3 @ 2 m/hop | 2% | 15% @ 2 m |
| 1 | 2 @ 3 m/hop | 0 | 0 |
| 0 | 1 @ 6 m/hop | 0 | 0 |

During multi-hop energy transfer, the intermediary devices transfer energy and retain little energy. The transfer efficiency is lower for a one-hop device compared to two-hop device. For example, a one-hop distance of 1 m from a source (40%) compares with two-hop 2 m from source device (63%); based on an efficiency of 73% for a 1 m distance from source without multi-hop. The third device can be a desired target or an interfering device. As such, when transferring energy to a desired target, other devices (those not in the energy transfer chain) should be configured to prevent good coupling with the target.

Thus, efficiency can be maintained by configuring controller 270 to provide a topology and coupling in magnetic field space so that energy transfer is maximized to the target, here node 230. Tuning can accomplished at any node in the chain (including an intermediary node) and can include making a physical adjustment (such as a geometry change) to yield a particular resonant frequency, changing inductance, and changing capacitance of a node. A downstream node, such as the receiver (at node 230), can provide feedback corresponding to received energy, and $\kappa$ estimate and $\Gamma$ estimate. In one example, controller 270 is configured to detune nearby nodes to reduce magnetic coupling and loading.

In one example involving energy transfer over multiple hops, the controller is configured to maximize the number of energy transfer hops. In one example, the number of communication hops (links between a particular node and the controller) is minimized.

For energy transfer from multiple energy sources to a single receiver the transfer from a "SUM" of energy sources to a single source is more efficient than the SUM of energy transfer from each source. Consider three nodes in a series A, B, C at a distance of 1 m. The efficiency of simultaneous transfer of energy from A to B and C to B (80%) is higher than the energy transfer from A to B (73%) or B to C. Thus, for energy transfer arrays, the efficiency of an array is higher than the efficiency of transfer from a single device, provided that the coupling coefficient between transmitters is minimized.

In one example, controller 270 is configured to optimize the energy transfer in sequential order of the four hops from the transmit node 220 to the receive node 230 shown in FIG. 2. In one example, controller 270 implements an iterative process of repeated calculations to optimize energy transfer efficiency.

As noted earlier, controller 270 can be a single module or it can be implemented as multiple modules, any of which can be distributed throughout the network or located remotely.

The various nodes illustrated in FIG. 2 are marked to represent a particular configuration at a particular time and at another time, the nodes can be reconfigured differently. In other words, a particular node can function as a nearby coil, as an intermediary coil, or as a receive coil. For example, consider a situation in which node 225C functions as the target (receive coil) and node 230 functions as a nearby coil. As such, controller 270 provides an instruction to node 230 via link 250F (link 250F is bidirectional in this example), calling for node 230 to change the coupling coefficient such that energy transfer to node 225C is maximized and energy transfer to node 230 is minimized.

In one example, controller 270 executes an algorithm to dynamically reconfigure the network to transfer energy from one or more source (transmit) nodes to one or more receive nodes. This can include any combination of instructions such as: an instruction to operate one or more transmit nodes in a particular manner; an instruction to increase a coupling coefficient as to one or more receive nodes or intermediary nodes; or an instruction to decrease a coupling coefficient as to one or more nearby nodes. In an example having a single receive node, the intermediary nodes and nearby nodes are configured to maximize energy transfer to the receive node. The algorithm implemented by controller 270 can dynamically and iteratively change node roles as the receive nodes change position, alignment, numerosity, or change another parameter.

Figure 3:
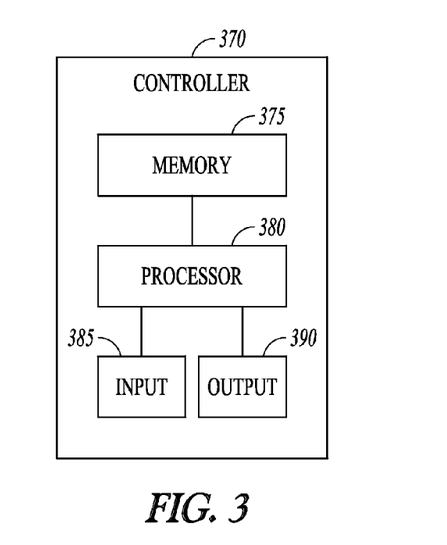
FIG. 3 illustrates a controller, according to one example.

FIG. 3 illustrates controller 370 according to one example. Controller 370 includes memory 375, processor 380, input module 385, and output module 390. Memory 375 can include removable or non-removable memory or other storage device. Memory 375 can be configured to provide storage for instructions for implementing an algorithm using processor 380. Memory 375 can be configured to provide storage for data corresponding to energy transfer within the system. Processor 380 can include an analog or digital processor configured to implement an algorithm such as that disclosed herein. Input module 385 can include an interface to receive a signal corresponding to performance of the system. For example, input module 385 can include encoding hardware and software to receive an analog signal and provide digital data to processor 380. In various examples, input module 385 includes a user interface or network interface configured to receive instructions and data, such as that corresponding to a measure of energy transfer at a particular sensor of a node or energy output from a node. A user interface can be manipulated, for example, to specify a particular pathway for energy transfer. Output module 390 can include an output interface to provide an instruction to tune performance of the system. In one example, output module includes a driver to provide a signal at a level to change a configuration of a node or a position of a node. In various examples, output module 390 includes a display or a network interface to provide data corresponding to the performance of the system. Input module 385 or output module 390 can include an electrical connector or an optical coupler.

FIGS. 4A, 4B, 4C, and 4D illustrate examples of tuning of a node, each of which is coupled to load 455. In the various examples, load 455 can include a device having circuitry powered by the magnetically coupled energy. In one example, load 455 is an open circuit, thus corresponding to an intermediary node.

Figures 4A, 4B:
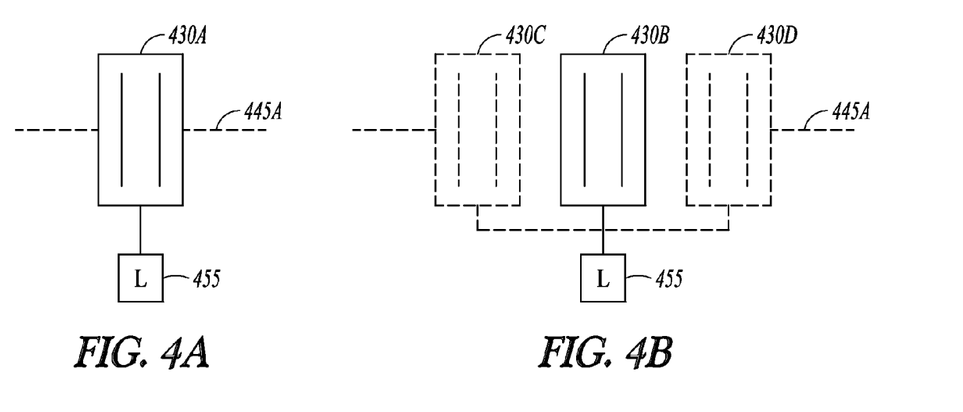
FIGS. 4A, 4B, 4C, and 4D illustrate controllable parameters, according to various examples.

FIG. 4A illustrates node 430A coupled to load 455. Node 430A includes a coil having axis 445A, along which the energy is transferred and along which another node is approximately located. Node 430A has a variable resonant frequency based on, for example, a change in the resistance, a change in capacitance, or a change in inductance. Node 430A can include variable elements that are selectable based on an instruction from, for example, controller 270.

The solid lines of FIG. 4B illustrate node 430B coupled to load 455 and the dashed lines depict alternate location 430C and alternate location 430D, all of which are located along axis 445A. In general, the alternate locations represent node placement that will increase or decrease the magnetic coupling with respect to other nodes (not shown). The selectable positions shown in FIG. 4B can also include translation in a direction perpendicular to axis 445A.

Figure 4C:
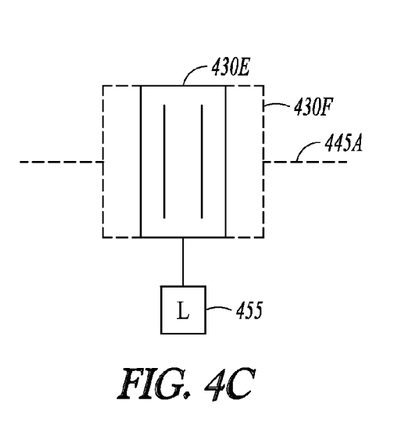

The solid lines of FIG. 4C illustrate node 430E coupled to load 455 and the dashed lines depict alternate form factor node 430F, both of which are located along axis 445A. Alternate form factor node 430F is shown to have a longer axial length and constant diameter, wherein the vertical lines within the form of node 430E represent an elevation view of electrical windings of a coil. The spacing of adjacent windings of a coil, such as that represented by node 430E, can be increased to change the resonant frequency, and thus the magnetic coupling. Other form factor changes are also contemplated, including increasing the diameter (for example, by electrically switching to an alternate set of windings).

Figure 4D:
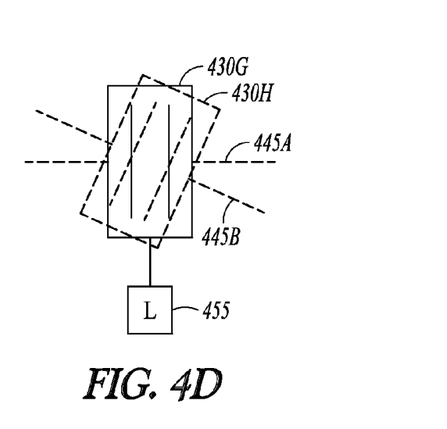

The solid lines of FIG. 4D illustrate node 430G coupled to load 455, having axis 445A, and the dashed lines depict alternate alignment of node 430H, having axis 445B. The alternate alignment of node 430H can be selected to provide greater or reduced magnetic coupling with a nearby node.

Combinations of the parameter variations shown in FIGS. 4A, 4B, 4C, and 4D are also contemplated in order to achieve a particular magnetic coupling. In addition, the same parameter variations can be applied to active nodes, such as node 220 in FIG. 2.

Figure 5:
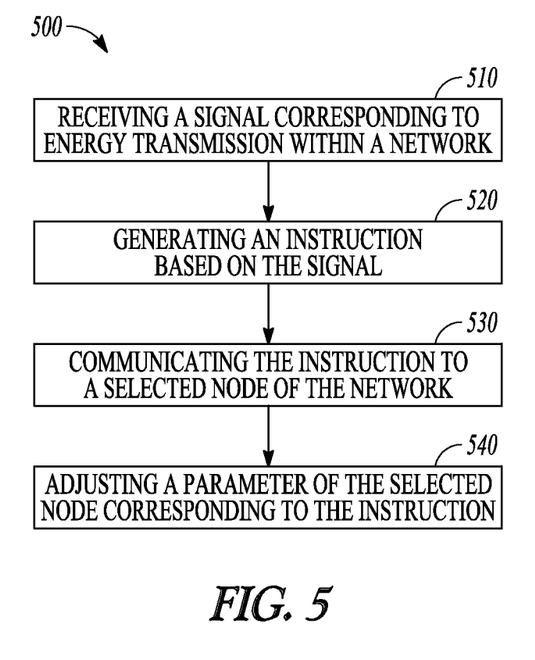
FIG. 5 illustrates a flow chart of a method, according to one example.

FIG. 5 illustrates method 500 implemented by one example of the present subject matter. At 510, method 500 includes receiving a signal corresponding to energy transmission within a network. The signal can originate from a node, from a sensor coupled to a node, or from a sensor coupled to a load associated with a particular node in the network. The sensor can provide a measure of resonant frequency, a measure of a differential frequency, a measure of energy, or a measure of magnetic coupling. The signal can be an analog signal or encoded in a digital signal and can be received at a controller by a wireless channel or by a wired connection.

In addition, receiving the signal can include determining a frequency, determining a distance, determining coil geometry, or determining relative orientation as to a first node and a second node of a network.

At 520, method 500 includes generating an instruction based on the signal. The instruction can be generated by, for example, controller 270 of FIG. 2. The instruction can be in the form of an analog signal or encoded as a digital signal.

In one example, generating the instruction can include determining an adjustment to a frequency, determining an adjustment as to a distance, or determining an adjustment as to relative orientation of a first node and a second node of the network.

At 530, method 500 includes communicating the instruction to a selected node of the network. The instruction can be communicated using a wireless or wired channel, and in one example, is communicated from controller 270 to a selected node, such as node 220 of FIG. 2.

At 540, method 500 includes adjusting a parameter of the selected node corresponding to the instruction. In various examples, this can include changing a resonant frequency of a node, adjusting a form factor of a node, changing alignment of a node, or changing position or adjusting a distance of a node.

Method 500 can be executed for each node of a system. In one example, the network is changeable in terms of node locations, node alignment, node performance, and the number of nodes (numerosity) of a particular type, and as such, method 500 is repeatedly executed.

Additional Notes & Examples

An example of the present subject matter includes a controller that manages the coupling between a transmitter coil and a receiver coil for maximum energy transfer efficiency. The controller can be located at either a transmit node, a receive node, or distributed in various locations.

A system includes a network of magnetically coupled nodes having at least one transmit coil configured to transfer energy to at least one receive coil, and includes a controller communicatively coupled to at least one node of the network. The controller is configured to control a selected parameter of the network based on a measurement corresponding to energy transfer within the network.

One example of the present subject matter provides a solution to the problem of wireless energy transfer. An example includes a controller configured to ensure appropriate coupling between nodes. The controller can be centrally located or located at one of the nodes, or distributed among multiple nodes. The nodes in the network are configured to wirelessly transfer magnetically coupled energy and also configured to form a communication network by which information can be sent from a first node in the network to a controller and by which the controller can send an instruction to a second node in the network. This communication network can be used to establish an optimal multi-hop configuration for a specific network. The controller can be configured to manage multiple transmit nodes and multiple receive nodes. The controller also includes a model of the energy transfer mechanism through multiple hops and hence determines an optimal combination of hops so that the energy transfer efficiency is maximized. The communication network is used by the receive node to request energy transfer by sending a message to the controller. The same communication network is used by the controller to instruct selected nodes in the network to function as transmit nodes, intermediary nodes, or as nodes not participating in the energy transfer. The participating nodes can change geometry and orientation of the coils so that coupling coefficient of each of the participating nodes is maximized. Nearby nodes not participating in the energy transfer can change the orientation of their coils to reduce or minimize the coupling coefficient for these nodes relative to the participating nodes in the network.

The controller, in one example, is configured to provide network management and energy transfer management using a multivariable model that tunes the frequency, orientation and multi-hop chain of nodes for maximum energy transfer. This is accomplished by feeding back the energy received at the receive node and other nodes in the network to the controller. The controller can be configured to implement a high fidelity model of energy transfer through multiple hops. The controller can also be configured to implement a set of rules obtained offline from the model.

In one example, the controller is configured to tune the frequency of the transmitted radiation. This can be accomplished by feeding back the energy being absorbed at the receiver node and the transmit node can change frequency according to a proportional gain, PID or other control algorithm. Frequency tuning can be effective when the transmit node and the receive node are of fairly similar geometries. In other examples, the controller may be configured to cause a geometry change or an orientation change. In addition, the receive node can send a signal corresponding to the geometrical parameters and the current orientation of its coil to the controller. In addition the controller can estimate the range (i.e. the distance between the receive node and the transmit node). Based on the known geometry of the transmit node and a mathematical model for energy transfer, the controller can calculate a geometry change (for example, to reduce the number of coil turns) for the transmit node so that the capacitance and inductance of the transmit node will couple well with those of the receive node. A frequency of radiation can also be calculated. This frequency can be further fine tuned through feedback from the receive node. If the receive node is mobile or if the transmit node is mobile, then the controller can also calculate a position that either the receive node or the transmit node should move to and use the communication channel to instruct the transmit node or the receive node to move to that position.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and other storage devices.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

Although a few embodiments have been described in detail above, other modifications are possible. For example, the logic flows depicted in the figures do not require the particular order shown, or sequential order, to achieve desirable results.

Other steps may be provided, or steps may be eliminated, from the described flows, and other components may be added to, or removed from, the described systems. Other embodiments may be within the scope of the following claims.

The claimed invention is:

1. A system comprising:
a network having a plurality of nodes, the plurality of nodes including a first node, an intermediary node, and a second node, the first node configured to transmit energy to the second node, the first node magnetically coupled with the second node by the intermediary node, the plurality of nodes including at least one controllable node having a selectable performance parameter and the plurality of nodes including at least one sensor, the at least one sensor configured to generate a signal corresponding to energy received by the sensor; and
a controller having an output coupled to the at least one controllable node, the output determined based on the signal and wherein the performance parameter is selected based on the output, wherein efficiency of energy transfer from the first node to the second node corresponds to the performance parameter and wherein the first node includes the at least one controllable node.

2. The system of claim 1 wherein the second node includes the at least one controllable node.

3. The system of claim 1 wherein the second node includes the sensor.

4. The system of claim 1 wherein the at least one controllable node is located between the first node and the second node.

5. The system of claim 1 wherein the at least one controllable node has a selectable coupling coefficient.

6. The system of claim 1 wherein the at least one controllable node includes a selectable resonant frequency, a selectable position, a selectable geometry, or a selectable alignment.

7. The system of claim 1 wherein the controller is configured to provide the output such that the signal corresponds to an increased energy transfer.

8. The system of claim 1 wherein the controller is configured to provide the output such that the signal corresponds to a decreased energy transfer.

9. The system of claim 1 wherein the controller is configured to communicate with the controllable node by a wireless link.

10. The system of claim 1 wherein the controller is configured to wirelessly receive the signal.

11. The system of claim 1 wherein the signal and the transmitted energy are carried by a common channel.

12. A controller comprising:
an input module configured to receive a signal corresponding to a sensor, the sensor responsive to energy received at a receiver and transmitted from a magnetically coupled transmitter of a wireless energy transfer network;
an output module configured to provide an instruction to a selected node of a plurality of nodes in the network, the plurality of nodes including the transmitter, the receiver, and an intermediary node, the instruction configured to select a parameter for the selected node, the signal determined based on the parameter; and
a processor coupled to the input module and coupled to the output module and configured to generate the instruction based on the signal, wherein efficiency of energy transfer between the transmitter and the receiver corresponds to the parameter.

13. The system of claim 12 wherein the output module is configured to transmit the instruction using a wireless link.

14. The system of claim 12 wherein the input module is configured to wirelessly receive the signal.

15. The system of claim 12 wherein the processor is configured to increase the signal.

16. A method comprising:
receiving a signal corresponding to energy received at a receiver node and using an intermediary node within a wireless energy transfer network, the wireless energy transfer network including a plurality of nodes and wherein the plurality of nodes includes the receiver node and the intermediary node;
generating an instruction based on the signal;
communicating the instruction to a selected node of the plurality of nodes of the wireless energy transfer network; and
adjusting a parameter of the selected node corresponding to the instruction, wherein the signal corresponds to the parameter.

17. The method of claim 16 wherein receiving the signal includes at least one of determining a frequency, determining a distance, determining a coil geometry, or determining relative orientation as to a first node and a second node of the network.

18. The method of claim 16 wherein generating the instruction includes at least one of determining an adjustment to a frequency, determining an adjustment as to a distance, or determining an adjustment as to relative orientation of a first node and a second node of the network.

19. The method of claim 16 wherein communicating the instruction to the selected node includes transmitting a wireless signal.

20. The method of claim 16 wherein communicating the instruction to the selected node includes receiving a signal at an electrical connector.

21. The method of claim 16 wherein adjusting the parameter of the selected node includes at least one of adjusting a frequency, adjusting a distance, adjusting a geometry, or adjusting alignment as to relative orientation of a first node and a second node of the network.

* * * * *